Patented Nov. 1, 1938

2,135,123

UNITED STATES PATENT OFFICE 2,135,123

1,1-ARYLOXY HALO ETHYLENES

Gerald H. Coleman and Bartholdt C. Hadler, Midland, Mich., assignors to The Dow Chemical Company, Midland, Mich., a corporation of Michigan No Drawing. Application March 20, 1937,
Serial No. 132,176

4 Claims. (Cl. 260—611)

This invention relates to the reaction of vinylidene halides with phenolates, and especially to the new compounds thereby produced.

Our new compounds have the formula:

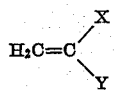

wherein X represents an aryloxy group, and Y represents a halogen atom. These compounds can be prepared by the interaction of a vinylidene halide and a metal salt of a monohydric phenol, preferably in an aqueous medium, at temperatures between about 150° and 250° C. Non-aqueous reaction media, such as benzene, which are themselves inert under reaction conditions, may also be employed.

The following example illustrates the practice of our invention:

242.5 grams (2.5 mols) of vinylidene chloride, 470 grams (5 mols) of phenol, 200 grams (5 mols) of sodium hydroxide and 500 milliliters of water were placed in a rotatable pressure reactor, which was then closed and heated for 5 hours at a temperature of 175° C. The reactor was cooled, opened, and the contents washed out with water. The aqueous solution was extracted with benzene and steam distilled to remove any residual oily product. The remaining water layer contained 3.61 mols of sodium chloride, showing that 72.2 per cent of the chlorine originally present in the vinylidene chloride, had reacted. The steam distillate was extracted with further portions of benzene, and the benzene extracts were combined and shaken with a dilute solution of sodium hydroxide to remove any remaining phenol. The extract was distilled to remove benzene and there was obtained 185.5 grams of an oily product which was subjected to fractional distillation. The principal fraction, comprising nearly 80 per cent of the product, boiled in the range 103°–106° C. at 20 millimeters absolute pressure; had a specific gravity at 20°/4° C. of 1.1656; a refractive index at 20° C., using sodium light, of 1.5511; and contained 61.90 per cent carbon, 4.54 per cent hydrogen, 10.11 per cent oxygen, and 23.45 per cent chlorine. One gram of this fraction absorbed bromine from 13.36 milliliters of a N/1 solution in carbon tetrachloride. The molecular weight was found to be approximately 158. This analysis corresponds to 1-phenoxy-1-chloro-ethylene, whose molecular weight is 154.5 and which has a theoretical carbon content of 62.1 per cent, and contains 4.5 per cent hydrogen, 10.4 per cent oxygen, and 23.0 per cent chlorine. One gram of this compound should react with 13.0 milliliters of a N/1 bromine solution. The structural formula is:

The residue, remaining after distillation of the main fraction, was a crystalline mass representing nearly 20 per cent of the original mixed product. This material had a melting point of 96.5 C., and contained 77.5 per cent carbon, 6.2 per cent hydrogen, 15.86 per cent oxygen, and 0.44 per cent chlorine. This corresponds approximately to the empirical formula $C_{14}H_{12}O_2$, and may possibly be 1,1-diphenoxy ethylene, although the structure has not been fully verified.

Among the minor products of the reaction was found a liquid, boiling at 140°–145° C. at 5 millimeters pressure, and having a chlorine content of about 11.7 per cent. The specific gravity at 20° C. compared with that of water at 4° C., is about 1.175.

Other vinylidene halides, e. g. vinylidene bromide and vinylidene chloro-bromide, may be employed in the preparation of these and similar compounds. The metal salts of other phenols, such as ortho-cresol, meta-cresol, para-cresol, the xylenols, the ethyl phenols, thymol, para-tertiarybutyl phenol, the amyl phenols, ortho-phenylphenol, para-phenylphenol, the naphthols, and the halogen substituted derivatives thereof, such as ortho-chloro-phenol, para-chloro-phenol, ortho-iodo-phenol, 2 - chloro - ortho - cresol, 4 - chloro - ortho - cresol, 2-chloro-para-cresol, 3-chloro-2-hydroxy-diphenyl, 5-chloro-2-hydroxy-diphenyl, 2,4,6-tribromo-phenol, 3-bromo-2-hydroxy - diphenyl, 3-bromo-4-hydroxy diphenyl, can be employed in the process to yield compounds analogous to those described. For example, ortho-chloro-phenol, when substituted for the phenol of the foregoing example, yields 1-(ortho - chloro - phenoxy)-1-chloro - ethylene. Similarly, 2,4,6-tribromo-phenol yields 1-(2,4,6-tribromo-phenoxy)-1-bromo-ethylene when substituted for the phenol of the foregoing example, and reacted with vinylidene bromide.

Other salts of the phenols may be employed, rather than the sodium salt, such as those of the other alkali metals, alkaline earth metals, and of those metals which form water-insoluble halides, i. e. the lead, mercury, and silver salts.

Our new compounds are useful as plasticizers, solvents, and as intermediates in the synthesis of various types of organic compounds.

Other modes of applying the principle of our invention may be employed instead of those explained, change being made as regards the method or compounds herein disclosed, provided the steps or compounds stated by any of the following claims or the equivalent of such stated steps or compounds be employed.

We therefore particularly point out and distinctly claim as our invention:

1. A compound having the formula:

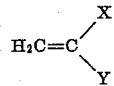

wherein X represents an aryloxy group and Y represents halogen.

2. A 1-aryloxy-1-halo-ethylene.
3. 1-phenoxy-1-halo-ethylene.
4. 1-phenoxy-1-chloro-ethylene.

GERALD H. COLEMAN.
BARTHOLDT C. HADLER.